(12) United States Patent
Simola et al.

(10) Patent No.: US 12,448,344 B2
(45) Date of Patent: Oct. 21, 2025

(54) PROCESS FOR THE CO-PRODUCTION OF DIALKYL SUCCINATE AND 1,4-BUTANEDIOL BY HYDROGENATING DIALKYL MALEATE IN TWO STAGES

(71) Applicant: CONSER S.P.A., Rome (IT)

(72) Inventors: Flavio Simola, Rome (IT); Gabriella Compagnone, Rome (IT); Emanuela Di Giampaolo, Rome (IT)

(73) Assignee: CONSER S.P.A., Rome (IT)

( * ) Notice: Subject to any disclaimer, the term of this patent is extended or adjusted under 35 U.S.C. 154(b) by 296 days.

(21) Appl. No.: 18/245,770

(22) PCT Filed: Mar. 12, 2021

(86) PCT No.: PCT/IT2021/000011
§ 371 (c)(1),
(2) Date: Mar. 17, 2023

(87) PCT Pub. No.: WO2022/190141
PCT Pub. Date: Sep. 15, 2022

(65) Prior Publication Data
US 2024/0308941 A1 Sep. 19, 2024

(51) Int. Cl.
*C07C 29/149* (2006.01)
*C07C 29/17* (2006.01)
(Continued)

(52) U.S. Cl.
CPC .......... *C07C 29/149* (2013.01); *C07C 29/172* (2013.01); *C07C 29/80* (2013.01); *C07C 67/303* (2013.01); *C07C 67/54* (2013.01)

(58) Field of Classification Search
CPC ... C07C 29/149; C07C 29/172; C07C 29/177; C07C 67/303; C07C 69/40; C07C 31/207
See application file for complete search history.

(56) References Cited

U.S. PATENT DOCUMENTS 2,110,488 A 3/1938 Justement
4,032,458 A 6/1977 Cooley et al.
(Continued)

FOREIGN PATENT DOCUMENTS

CN 101747149 A 6/2010
CN 102070448 A 5/2011
(Continued)

OTHER PUBLICATIONS

Yutaka Tokiwa, et al., Biodegradability of Plastics, International Journal of Molecular Sciences, 2009, 10, published Aug. 26, 2009, pp. 3722-3742.

*Primary Examiner* — Yate' K Cutliff
(74) *Attorney, Agent, or Firm* — Zareefa Flener; Yongae Jun; Jie Yang

(57) ABSTRACT

A process for the efficient co-production of dialkyl-succinate and 1,4-butanediol by catalytic hydrogenation of dialkyl maleate comprising essentially the following steps: (i) hydrogenating a stream of dialkyl maleate in a first stage of reaction over suitable catalyst to produce dialkyl succinate; (ii) separating the effluent from the first stage of reaction in a flash vessel to produce a liquid stream, rich in dialkyl succinate; (iii) further hydrogenating part of the dialkyl succinate produced in the first stage of reaction in a second stage of reaction, by using the hydrogen gas from the first stage and by means of a different suitable catalyst, for producing mainly 1,4-butanediol, wherein in both stages of reaction, the conditions as hydrogen/organic feed ratio, pressure and temperature are such to maintain the reactors in mixed liquid/vapor phase.

15 Claims, 5 Drawing Sheets

(51) Int. Cl.
    *C07C 29/80*     (2006.01)
    *C07C 67/303*     (2006.01)
    *C07C 67/54*     (2006.01)

(56) References Cited

U.S. PATENT DOCUMENTS

| | | |
|---|---|---|
| 4,584,419 A | 4/1986 | Sharif et al. |
| 4,656,297 A | 4/1987 | Kouba et al. |
| 4,751,334 A | 6/1988 | Turner et al. |
| 5,606,099 A | 2/1997 | Darsow |
| 5,872,276 A | 2/1999 | Darsow |
| 6,100,410 A | 8/2000 | Tuck et al. |
| 6,191,322 B1 | 2/2001 | Bertola |
| 6,239,292 B1 | 5/2001 | Tuck et al. |
| 6,248,906 B1 | 6/2001 | Bertola |
| 6,274,743 B1 | 8/2001 | Tuck et al. |
| 6,350,924 B1 | 2/2002 | Fischer et al. |
| 6,392,088 B1 | 5/2002 | Bertola et al. |
| 6,433,192 B1 | 8/2002 | Fischer et al. |
| 6,433,193 B1 | 8/2002 | Bertola et al. |
| 6,989,455 B2 | 1/2006 | Hepfer et al. |
| 7,598,404 B2 | 10/2009 | Backes et al. |
| 9,040,756 B2 * | 5/2015 | Simola ............... C07C 29/172 549/325 |

FOREIGN PATENT DOCUMENTS

| | | | |
|---|---|---|---|
| CN | 102190582 A | 9/2011 | |
| CN | 102190582 B * | 6/2014 | ........... C07C 29/149 |
| CN | 104193619 A | 12/2014 | |
| EP | 2782893 B1 | 10/2014 | |
| WO | 8203854 A1 | 11/1982 | |
| WO | 2013076747 A1 | 5/2013 | |

* cited by examiner

PROCESS FOR THE CO-PRODUCTION OF DIALKYL SUCCINATE AND 1,4-BUTANEDIOL BY HYDROGENATING DIALKYL MALEATE IN TWO STAGES

The present invention relates to a process for the efficient co-production of dialkyl-succinate and 1,4-butanediol by catalytic hydrogenation of dialkyl maleate. The process consists essentially in the following steps:
  (a) hydrogenating a stream of dialkyl maleate in a first stage of reaction over suitable catalyst to produce dialkyl succinate;
  (b) separating the effluent from the first stage of reaction in a flash vessel to produce a liquid stream, rich in dialkyl succinate and splitting this stream in three portions:
   i) a first part, corresponding to less than 50% by mol of total production, is further subject to low pressure phase separation, to separate the absorbed hydrogen, and to distillation to produce high purity dialkyl succinate;
   ii) a second part is sent to the second stage of reaction;
   iii) a recirculation liquid, which by a pump is cooled in a heat exchanger and sent back to the inlet of the first stage of reaction;
  c) further hydrogenating the above second part of the dialkyl succinate produced in the first stage of reaction in the second stage of reaction, by using a different suitable catalyst, for producing mainly 1,4-butanediol, together with minor amounts of gamma-butyrolactone and tetrahydrofuran as co-products; the effluent is subject to cooling, phase separation and distillation to produce 1,4-butanediol,
wherein,
  the first stage of reaction operates from 80 to 130° C. as inlet temperature, from 30 to 80 bar as pressure and with liquid hourly space velocity from 0.5 to 2.0;
  the second stage of reaction operates from 160 to 190° C. as inlet temperature, from 30 to 80 bar as pressure and with liquid hourly space velocity from 0.1 to 0.3;
  the hydrogen/organic feed molar ratio is in the range from 15 to 30 in the first stage of reaction and from 30 to 60 in the second stage of reaction;
  the amount of dimethyl succinate, not converted in the second stage of reaction and separated by distillation in mixture with some amount of gamma-butyrolactone, is recycled to the second stage of reaction;
  in both stages of reaction, the conditions as hydrogen/organic feed ratio, pressure and temperature are such to maintain the reactors in mixed liquid/vapor phase.

FIELD OF THE INVENTION

Embodiments disclosed herein relate generally to process and equipment to co-produce 1,4-butanediol, together with dialkyl succinate as co-product, by reacting a feed, consisting of alkyl maleate, with hydrogen gas in a two stages reaction over suitable catalysts.

BACKGROUND OF THE INVENTION

Over the last decades, the world production of plastic materials and, therefore, of plastic waste is dramatically increased.

Consequently, the biodegradable and the polymers have biodegradable/compostable attracted wide attention, as substitutes of the traditional and durable plastic polymers.

In the scenario of new biodegradable plastics, the polybutylene succinate (PBS) is one of the most interesting products, thanks to the combination of its excellent characteristics, as easily compostable material, its mechanical properties, its compatibility with other polymers and its processability.

Polybutylene succinate may be used for many applications, particularly for agricultural film, rather than LDPE, and for food contact applications.

The paper "Biodegradability of Plastics, International Journal of Molecular Sciences, 2009 Aug. 29, by Y. Tokiwa et al.", besides describing the mechanism of biodegradation of PBS and other plastics, highlights the advantages of the biodegradable plastics, as increased soil fertility, low accumulation of bulky plastic materials in the environment and reduction of cost of waste management. Furthermore, biodegradable plastics can be recycled to useful metabolites (monomers and oligomers) by microorganisms and enzymes.

The polybutylene succinate is produced by using 1,4 butanediol (BDO) and succinic acid (SA) as raw materials, through an esterification/polycondensation process with production of water; as alternative, the PBS may also be produced from butanediol and dimethyl succinate (DMS), by a transesterification/poly-condensation process with production of methanol, rather than water.

The polybutylene succinate may be produced as a pure polymer or also as a copolymer, as for example the polybutylene succinate-co-butylene terephthalate (PBST), using the co-esterification with terephthalic acid (PTA), or the poly-butylene succinate-co-adipate (PBSA), using adipic acid (AA). A further option is the production in blend with other polymer, as for example the polybutylene succinate (PBS) and polybutylene adipate-co-terephthalate (PBAT) blend.

Unfortunately, even if the interest in PBS is large, the high price of the raw materials is deeply affecting the competitiveness of PBS and it is limiting its production. Particularly, both the succinic acid and the dimethyl succinate have today a very high price. Most of the succinic acid today in the market is bio-produced by fermentation, with very high production cost. The dimethyl succinate, which today is mostly produced by esterification of the bio-SA with methanol through a dedicated plant, has even higher cost.

Therefore, it would be desirable to providing new processes or improved processes, in order to simplifying the industrial process of manufacturing the raw materials of the PBS products and to decreasing their production cost.

1,4-butanediol (BDO) is a versatile chemical intermediate, thanks to its terminal, primary hydroxyl groups and to its chemical resistant nature.

BDO is an important raw material in the synthesis of technically relevant polymers such as thermoplastic urethanes and polyesters, mainly polybutylene terephthalate (PBT), polyester plasticizers, paints, coatings and adhesives.

In the past years the largest consumer of BDO was tetrahydrofuran (THF), used to produce poly-tetramethylene ether glycol (PTMEG), a key raw material for spandex fibers. Substantial quantities of BDO go into the manufacture of gamma-butyrolactone (GBL), which is in turn the main raw material used to manufacture N-methyl-pyrrolidone (NMP) and other pyrrolidones.

Another important downstream derivative of BDO is the polybutylene terephthalate (PBT).

There are a number of routes to manufacture BDO: the first commercial route was the Reppe process from acetylene and formaldehyde. Other technologies include the production from butadiene, from propylene oxide, from allyl alcohol and more recently through biotransformation process.

Thanks to the availability and low cost of the raw material, in the last thirty years and in the next future the processes based on butane/maleic anhydride tend to dominate the market.

As described in EP2782893 B1 of the same Applicant, the processes based on butane/maleic anhydride comprise two main groups.

The first group includes all processes based on the esterification of the maleic anhydride by methanol, ethanol or other alcohols and the following hydrogenation of the dialkyl ester, usually as dimethyl maleate (DMM), to butanediol and/or, depending on the conditions of pressure and temperature and on the catalyst, to tetrahydrofuran and gamma-butyrolactone.

The second group on the contrary includes the processes based on the direct hydrogenation of the maleic anhydride or maleic acid to BDO and/or THF and GBL. Even if theoretically these processes appear to be simpler, with fewer processing steps (both the maleic anhydride purification and the esterification are not necessary), in the industrial application they met with poor success, probably due to the high cost of the catalyst and of the sophisticated materials of construction necessary in presence of maleic acid at high temperature.

Considering again the processes of the first group based on the esterification of the maleic anhydride, another distinction can be made between the processes based on the hydrogenation in vapor phase and the processes based on the hydrogenation in mixed liquid/vapor phase.

The new process introduced in the present invention for the co-production of BDO and DMS belongs to the hydrogenation processes of diesters of the maleic anhydride in mixed phase.

Irrespective of the vapor or mixed phase, it is believed that the reaction of dimethyl maleate to 1,4-butanediol proceeds through at least two intermediates, as follows:

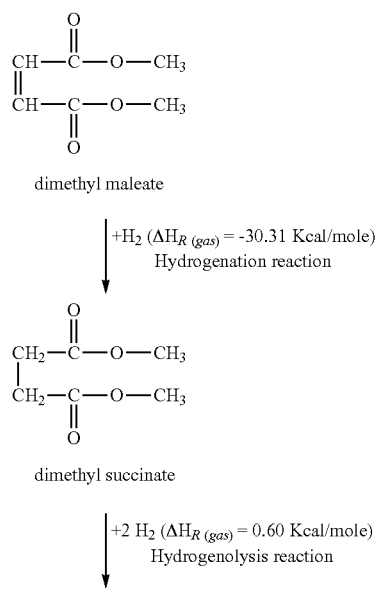

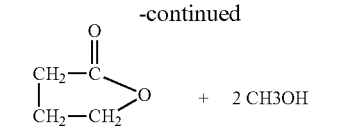

gamma-butyrolactone

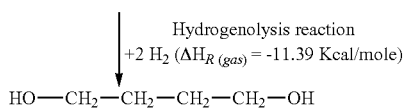

1,4-butanediol

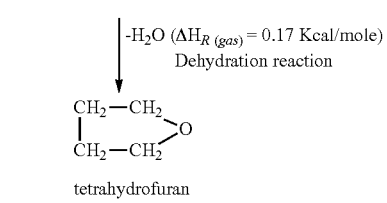

tetrahydrofuran

In conclusion, dimethyl succinate, 1,4-butanediol, tetrahydrofuran and gamma-butyrolactone are products of reaction which are converted one to another by addition/subtraction of hydrogen and/or water. The products distribution changes, by adjusting the operating parameters of the hydrogenolysis reaction or the type of catalysts.

In particular, dimethyl succinate represents the first product of hydrogenation and its final content in the reaction product is, in the common practice, very low, below 10% or even below 2%. The residual amount of DMS is lower, as the temperature and pressure are higher and as the space velocity is lower.

In the prior art several inventions have been applied on the hydrogenation of maleic anhydride esters to produce 1,4-butanediol or, in some cases, to produce dimethyl succinate.

U.S. Pat. No. 2,110,488 can be considered the first application concerning the hydrogenation of an ester of aliphatic carboxylic acids to produce aliphatic alcohols using a catalyst consisting of copper oxide and chromium oxide, within a temperature range from 250 to 300° C. and within a pressure range from 150 to 300 atmospheres.

On the other hand, U.S. Pat. No. 4,032,458 is the first application on the production of 1,4-butanediol, where solution containing maleic acid is first subject to esterification by a monohydric alcohol. The resulting dialkyl ester of maleic acid is hydrogenated in two reaction steps, the first step to saturate the double bond present in the maleic acid and the second step to produce 1,4-butanediol and the monohydric alcohol. Both reaction steps uses a copper-chromite catalyst. Reaction temperatures are in the range from 100 to 300° C., reaction pressures from 172 to 241 barg, being the catalyst dissolved in slurry. Moreover, since the catalyst of the first reaction step is copper chromite, the selectivity to DMS is low, with the resulting formation of hydroxyl group.

WO patent 82/03854 is a generic process to hydrogenate a carboxylic acid ester in vapor phase with a catalyst comprising a mixture of copper oxide and zinc oxide. One of the several possible applications concerns the production of 1,4-butanediol from an ester of maleic, fumaric or succinic acid.

U.S. Pat. No. 4,584,419 consists in a process to hydrogenate an ester of maleic anhydride to butanediol in vapor phase in the presence of a copper chromite catalyst.

U.S. Pat. No. 4,656,297 is another process to produce butanediol by the hydrogenation in vapor phase of dimethyl succinate with copper chromite catalyst, by adding methanol to the ester feed.

U.S. Pat. No. 4,751,334 is also an hydrogenation process in vapor phase with Cu—Cr or Cu—Zn oxide catalyst, to produce 1,4-butanediol from diethyl maleate in two or three adiabatic hydrogenolysis zones in series.

U.S. Pat. Nos. 5,606,099 and 5,872,276 refers to a process to hydrogenate dialkyl maleate to dialkyl succinate in liquid phase at a pressure of from 50 to 400 bar, at temperature of from 30 to 160° C. and at hydrogen/feed molar ratio from 20 to 40. The catalyst consists of pressed powders of the elements of the iron subgroup with addition of elements of transition groups IV or V or elements of sub-group VI, having particular compressive strength and internal surface area.

U.S. Pat. Nos. 6,100,410, 6,239,292, 6,274,743, 6,350,924, 6,433,192 and 6,433,193 describe different special integrations between a maleic anhydride plant and a BDO production plant, wherein the maleic anhydride absorbed in an organic solvent is first esterified and the resulting maleic ester is stripped by a stream of hydrogen and then subject to an hydrogenation in vapor phase.

U.S. Pat. No. 6,191,322 is a process for the production of BDO by mixed phase catalytic hydrogenation of gamma-butyrolactone or succinic anhydride esters or their mixtures in two catalytic beds in series with injection of cold hydrogen between the reaction stages, at pressure of from 75 to 90 bar and temperature between 160 and 250° C. The catalyst can be selected between copper and zinc oxide or copper chromite.

U.S. Pat. No. 6,248,906 is a process where the maleic anhydride ester is subject to two subsequent hydrogenation steps, where the primary hydrogenation produces mainly GBL and THF and the secondary hydrogenation converts a fraction of GBL to BDO. The first reaction zone of the primary hydrogenation fully hydrogenates DMM to DMS, by using a noble metal based catalyst, in vapor phase, under moderate pressure, 3 to 40 bar, and high molar ratio hydrogen/ester feed.

U.S. Pat. No. 6,989,455 refers to a two stages hydrogenation process to butanediol, specific for a feedstream comprising maleic acid in water solution. The first reaction stage product comprises succinic acid. Owing of the corrosive effects of the maleic acid, the temperature of the first stage does not exceed 130° C. However, the process had not commercial application due to the poor resistance of catalysts applied in aqueous maleic acid solution.

U.S. Pat. No. 7,598,404 refers to a process targeted to producing mainly tetrahydrofuran with enhanced utilization of the heat of reaction. The feed is first hydrogenated in a pre-reactor zone comprising catalyst, which favors the carbon double bond saturation, i.e. the production of dimethyl succinate from dimethyl maleate. In this way, the heat of reaction may be utilized in the evaporation of some of the liquid feed. Accordingly, in the second reaction zone, where THF and optionally diol and/or lactone are produced, the reaction occurs strictly under conditions of complete vaporization.

CN patent 101747149 discloses a method for prepare BDO by two stages hydrogenation in series, by using maleic acid dialkyl ester, where the effluent from the first reaction step separates in two phases and the resulting liquid product is contacted again with hydrogen in the second hydrogenation section. The scope is to obtain high conversion and selectivity. However, the 1,4 butanediol is the main product of both first and second reaction steps.

EP 2782893, similarly to U.S. Pat. No. 7,598,404 relates to a first stage of reaction wherein the hydrogen saturates the double bond and produces preferentially dimethyl succinate and wherein one of the scopes is the improved use of the heat of reaction. Both stages of reaction operate in mixed liquid-vapor phase.

CN102070448 discloses a method for preparing dimethyl succinate, which includes two reaction steps of esterification and hydrogenation. The process is dedicated to a single product (DMS), and therefore in combination with a dedicated BDO plant to produce PBS it requires large investment.

CN102190582 relates to a method of simultaneously producing DMS, at low pressure, and BDO, at medium pressure, from DMM. However, two pressure levels are required and, therefore, the number of hydrogen compressors needs to be doubled accordingly.

CN 104193619 describes a process to produce dimethyl succinate, by hydrogenation and purification, using as raw material an intermediate product, a stream rich in dimethyl maleate and methanol, produced in the esterification unit of a butanediol plant. Rather than a real co-production of DMS and BDO in a single plant, the invention consists in two hydrogenation units, each one with independent reactor, compressor, heat exchangers and other equipment, connected in parallel.

Most of the above mentioned and other patents not included in this application refer to the production of butanediol and/or tetrahydrofuran by hydrogenation of dialkyl maleate, mostly in vapor phase or, in few cases, in liquid or mixed phase. The reference to the formation of dimethyl succinate in a separate reaction step, as for example in U.S. Pat. Nos. 4,032,458, 6,248,906, 7,598,404 and EP 2782893, is always occasional and not addressed to the production or co-production of dimethyl succinate. Only CN102190582 and CN 104193619 introduce the co-production of BDO and DMS. However, in both applications, the two products needs two separated hydrogenation compressor units, with evident higher investment and production costs.

Few other patents, for example U.S. Pat. Nos. 5,606,099, 5,872,276 and CN 102070448 relate only to the production of dimethyl succinate, by hydrogenation of dimethyl maleate.

Matter of the present invention is a method of efficient and low cost co-production of 1,4-butanediol and dialkyl succinate from dialkyl maleates in a single hydrogenation plant, by using the less expensive process in liquid-vapor mixed phase.

SUMMARY OF THE DISCLOSURE

The present invention relates to a process for the co-production of 1,4-butanediol and dialkyl succinate by catalytic hydrogenation of dialkyl maleates.

The process consists essentially in the following steps:
a) hydrogenating a stream of dialkyl maleate in a first stage of reaction over suitable catalyst to produce dialkyl succinate;
b) separating the effluent from the first stage of reaction in a flash vessel to produce a liquid stream, rich in dialkyl succinate, and splitting this stream in three portions:
   i) a first part, corresponding to less than 50% by mol of total production, is further subject to low pressure phase separation, to separate the absorbed hydrogen, and to distillation to produce high purity dialkyl succinate ii) a second part is sent to the second stage of reaction iii) a recirculation liquid, which by a pump is cooled in a heat exchanger and sent back to the inlet of the first stage of reaction c) further hydrogenating the above second part of the dialkyl succinate produced in the first stage of reaction in a second stage of reaction, by using a different suitable catalyst, for producing mainly 1,4-butanediol, together with minor amounts of gamma-butyrolactone and tetrahydrofuran as co-products; the effluent is subject to cooling, phase separation and distillation to produce 1,4-butanediol wherein, the first stage of reaction operates from 80 to 130° C. as inlet temperature, from 30 to 80 bar as pressure and with liquid hourly space velocity from 0.5 to 2.0;

the second stage of reaction operates from 160 to 190° C. as inlet temperature, from 30 to 80 bar as pressure and with liquid hourly space velocity from 0.1 to 0.3;

the hydrogen/organic feed molar ratio is in the range from 15 to 30 in the first stage of reaction and from 30 to 60 in the second stage of reaction;

the amount of dimethyl succinate, not converted in the second stage of reaction and separated by distillation in mixture with some amount of gamma-butyrolactone, is recycled to the second stage of reaction;

in both stages of reaction, the conditions as hydrogen/organic feed ratio, pressure and temperature are such to maintain the reactors in mixed liquid/vapor phase.

The above-described operation in mixed liquid/vapor phase represents one of the fundamental aspects of the process presented in this application. In fact, in most of the patents and in most of the industrial plants for the production of BDO from maleic anhydride, via dimethyl maleate as intermediate product, the hydrogenation step occurs in vapor phase. Because of the very large amount of circulating hydrogen gas, both the reactants and the products of reaction are in vapor phase. The possible dimethyl succinate produced in a hypothetical first stage of reaction could be separated from the reaction gas only by means of a substantial cooling and condensation step, followed to a subsequent further stage of heating of the fraction of DMS fed to the hydrogenolysis stage for the production of butanediol.

In conclusion, the process of the present application, characterized by DMS separation obtained with a simple phases separation, is practicable only for reaction with relatively low circulation of hydrogen and with the hydrogenation reactions in mixed phase.

Anyhow, the practice in mixed phase does not constitute a limitation of the application. On the contrary, as well described in EP 2782893, the hydrogenation in liquid/vapor phases, compared to the vapor phase, offers different advantages in terms of reduced investment cost, reduced energy consumption, higher reaction selectivity, better quality of the BDO product and lower tendency of catalysts to fouling and deactivation problems.

Moreover, the advantages introduced by the present invention are also particularly enhanced when the process is applied to a dialkyl maleate feedstock characterized by high purity. As a matter of fact, if the very high selectivity of the first stage of reaction, using a dedicated catalyst specialized for the hydrogenation of the double bond, meets a high purity of the feedstock, the result is a product of exceptional purity. The resulting dialkyl succinate needs a very simple purification or even it can be used as it is, without any purification.

The high purity dialkyl maleate could be produced for example according to U.S. Pat. No. 6,392,088, wherein the dialkyl ester produced by esterification of a dicarboxylic anhydride with methanol in a two stages reactive distillation product is afterword subject to an system. The reaction atmospheric stripping, to remove the excess of methanol, and then to a vacuum distillation, to separate as bottom product the homogeneous catalyst and the residual mono-alkyl ester. The pure dimethyl ester is recovered as an overhead stream of the vacuum distillation column.

In order to preserve the high purity of the dialkyl succinate produced, the recycle of unconverted DMS to the hydrogenation, differently from the prior art, shall be sent to the second stage, rather than to first one. In fact, since the DMS forms an azeotropic mixture with GBL, the recycle stream is inevitably mixed with some amount of GBL, which, if recycled to the first stage of reaction, should deteriorate the quality of the DMS produced.

The two stages reaction system, as proposed in this invention, permits the co-production of DMS and BDO, used in mixture as raw materials for the production of polybutylene succinate, in a single industrial plant by using single compressor for the circulation of hydrogen. Moreover, the proposed method minimizes the amount of circulation hydrogen, by using a lower hydrogen/organic feed molar ratio in the first stage of reaction, where the organic feed flowrate is higher. The molar ratio is higher in the second stage, where the organic feed flowrate, after the draw-off of the part of the product corresponding to the desired DMS production, is lower and where the reaction conditions and catalyst require a higher hydrogen amount.

Examples of suitable catalysts to be used in the first stage include low content palladium catalysts supported on carbon or on alumina or other noble metal, ruthenium or platinum, supported on carbon, alumina or silica. The content of noble metal is between 0.1 to 2.0% by weight, relative to the total weight of the catalyst.

Examples of suitable catalysts for the hydrogenolysis reaction in the second stage include copper containing catalysts, such as copper-chromite catalysts or copper-zinc oxide catalysts.

Typically, the hydrogen used in the process is commercial pure hydrogen, with low content of inerts and other hydrocarbon components. Its amount is controlled to have a small stoichiometric excess but sufficient to ensure the completion of the reaction.

Both reaction zones operate at a pressure of 30 to 80 bar, preferably of 50 to 75 bar. Too low pressure increases the GBL yield and does not permit to maintain the reaction components in liquid phase. Pressure higher than 80 bar does not produce evident yields advantage and causes only increased capital and operating costs.

The reaction temperatures are maintained at the inlet of the first reactor between 80 to 130° C. and at the inlet of the second reactor between 160 and 190° C. Due to the exothermicity of the hydrogenation reactions, the outlet temperature in both stages is higher than the inlet temperature. A recirculation of cooled product in the first stage and the injection of minor amounts of cold hydrogen recycle gas in the second stage permit the control of the reaction outlet temperatures.

One fundamental aspect of the present process is the use of different hydrogen/organic feed molar ration in the two stages of reaction. In the first stage of reaction, where the organic feed flowrate is higher, the ratio is 15 to 30. In the second stage, where the reaction conditions and the catalyst require a higher hydrogen amount, the molar ratio is 30 to 60. The contact time with catalyst, expressed in terms of liquid space velocity, is 0.5 to 2.0 $hr^{-1}$ in the first stage of reaction and 0.1 to 0.3 $hr^{-1}$ in the second stage of reaction.

The process of this invention allows modifying the relative molar ratio of dimethyl succinate and butanediol produced in a very simple manner: just by changing the flow rate of the DMS extracted at the outlet of the first stage of reaction. Therefore, according to the present application, the DMS/BDO ratio can be adjusted from 0.05, in case of a relative small production of PBS and a relative high production of BDO, used for other BDO derivatives or also, as pure product, for market sale, to around about 0.4 to 0.5, when all the production is intended for PBS production. When the final destination is the production of polyester co-polymers, as PBST or PBSA, or of blends of PBS with other polyesters using BDO, for instance a blend of PBS and PBAT, the process permits the adjustment of molar ratio DMS/BDO at a value between 0.05 and 0.40, depending on the characteristics of the final copolymer or polymers blend.

According to the common knowledge described by the technical literature and old applications, the process can also co-produce, besides DMS and BDO, also variable amounts of tetrahydrofuran (THF) and gamma-butyrolactone (GBL)

According for example to the process described in EP 2782893, the THF/BDO ratio may be modified by means of moisture removal from the recycle gas. The THE production increases even by subjecting the butanediol to a process of dehydration at moderate temperature, 120 to 250° C., which may occur by contact with an acidic catalyst of the silica-alumina type or of the polymer-based resin with sulfonic acid group.

Moreover, the (THF+GBL)/BDO ratio may increase by lowering the pressure of the hydrogenation reaction.

Moreover, also the production of gamma-butyrolactone may change from zero to around 5 to 15 percent, by adjusting its recycle rate, between full recycle to zero recycle, from the purification to the hydrogenation section.

BRIEF DESCRIPTION OF DRAWINGS

FIG. 2 represents the prior art, in three different configurations, as:

DETAILED DESCRIPTION OF THE INVENTION

The present invention will be now described with reference to the drawings.

Figure 1:
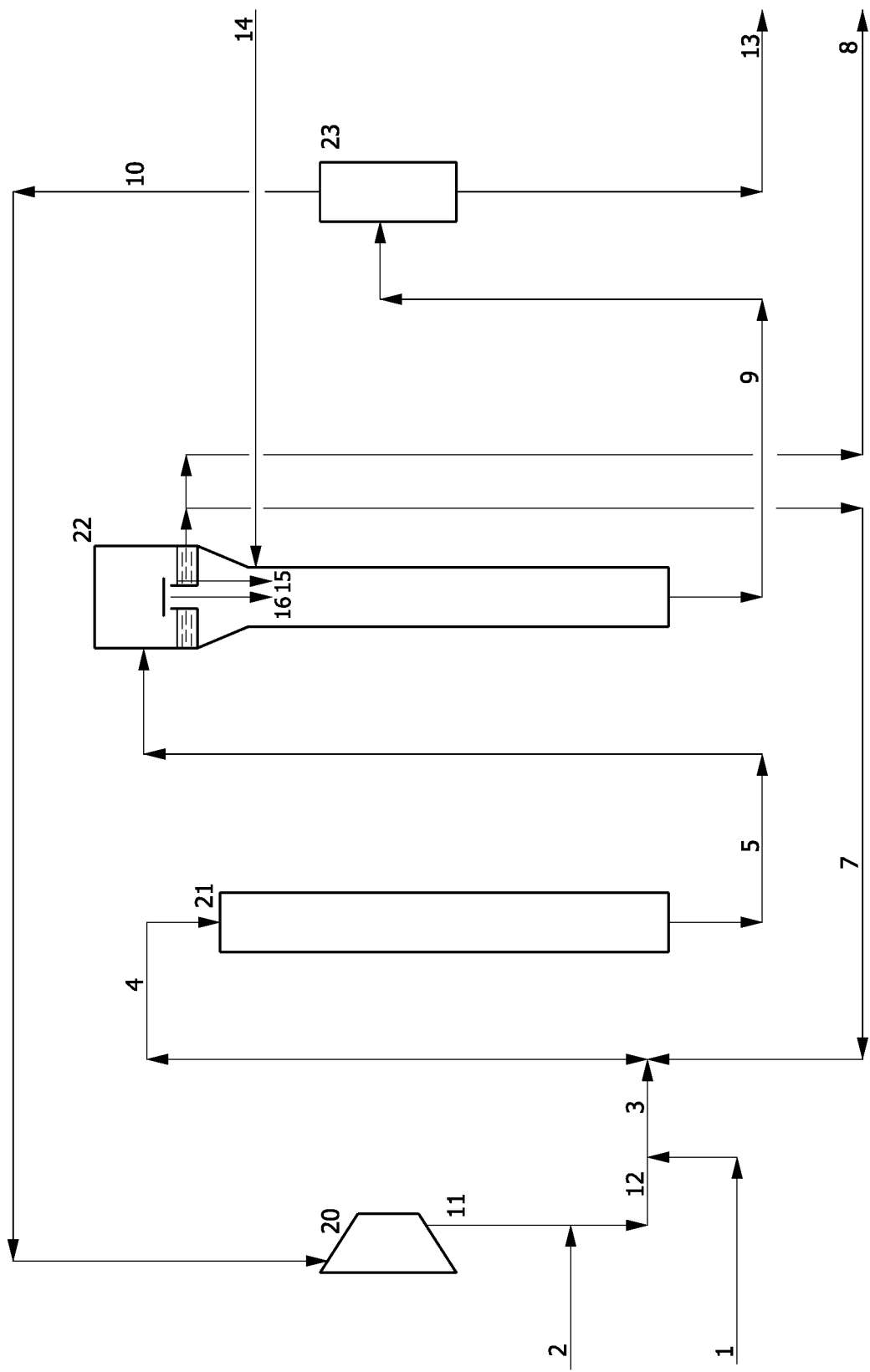
FIG. 1 is a simplified process flow diagram of the hydrogenation system, as described in the summary of the disclosure points (a), (b) and (c), to co-produce dialkyl succinate and 1,4-butanediol and, optionally, gamma-butyrolactone and/or tetrahydrofuran by catalytic hydrogenation of dialkyl maleates.

FIG. 1 illustrates a plant according to the invention for the co-production of DMS, BDO and, optionally GBL and THE, by catalytic reaction of a dialkyl maleate, typically dimethyl maleate, with hydrogen in mixed liquid-vapor phase.

The figure shows only the main unit operations relevant to the process of the present application, without including, for scope of clarity, the service equipment, as pumps or heat exchangers, which are normally included in an industrial plant, according to the chemical engineering principles.

The dimethyl maleate, produced by catalytic esterification of maleic anhydride, is fed as stream 1 in liquid phase. Stream 1 is mixed with stream 12, which represents the mixture of the fresh hydrogen stream 2 with the recycle gas stream 11.

The resulting stream 3 is therefore a mixed liquid/vapor fluid. After joining the cooled recirculation liquid stream 7 from the outlet of the first hydrogenation reactor, the resulting mixture stream 4 enters the first stage of reaction 21. It is a downflow fixed bed adiabatic reactor, containing a specific catalyst highly selective for the saturation of the carbon double bond contained in the dialkyl-maleate.

In the catalyst bed of reactor 21, the dimethyl maleate reacts to dimethyl succinate with very high conversion and selectivity. This reaction is highly exothermic and therefore the outlet temperature of the effluent stream 5 is somewhat higher than the temperature of the inlet stream 4. In a preferred embodiment of this process, the outlet temperature of the first reactor stage matches the inlet temperature of the second reaction stage and, therefore, no heating or cooling is necessary between the two stages of reaction. However, for scope of control in all possible plant modes of operation, a heat exchanger, even if not operated under the normal conditions of operation, may contribute to a better temperature control.

The effluent from the reactor first stage 5, under controlled temperature, is a liquid/vapor mixture, where the liquid phase is mostly dimethyl succinate and the vapor phase is mostly hydrogen.

The effluent from the first stage of reaction enters a flash vessel to produce a liquid stream, rich in dialkyl succinate, which is divided in three portions. A first part stream 8, corresponding to 5 to 50 mol % of the total production, is the raw DMS produced in the unit. It is further subject to low-pressure phase separation, to separate the absorbed hydrogen, and to distillation to produce high purity dialkyl succinate (not represented in the figure).

A second part of the liquid, stream 15, is sent to the second stage of reaction, through for example an overflow pipe or a downcomer installed in a chimney tray above the catalyst bed of the second stage of reaction.

A third part, the recirculation liquid steam 7, after cooling is sent back to the inlet of the first stage of reaction, together with stream 3.

In FIG. 1, the flash of the first reactor effluent occurs in an enlarged top section of the second stage of reaction, equipped with a chimney tray, including an overflow device, of pipe or downcomer type. Thanks to the enlarged section of the reactor, the vapor phase, mostly hydrogen, and the liquid phase, mostly dimethyl succinate, separate each other. The vapor phase, stream 16, passes through the single chimney or multiple chimneys of the tray. The liquid phase accumulates on the tray, which level is controlled by the overflow device. Part of the liquid, the first, stream 8, and the third part, stream 7, previously described, are extracted from a lateral nozzle, both of them under control of flowrate. The liquid in excess stream 15, together with the vapor phase stream 16, enter the catalyst bed of the second stage reactor 22.

The enlarged top section of the reactor, as described in the FIG. 1, is the better and economical solution for the separation of the phases. Of course, the process can use different engineering solutions, as the use of a flash vessel, separated from the reactor, to obtain the same results.

A further solution consists in the use of two stacked reactors, with intermediate separation of phases.

The liquid stream 14, containing a minor amount of unconverted DMS recycled back from the purification section of the plant, normally in mixture with some amount of GBL, also enters the catalyst bed of reactor 22.

Efficient liquid distributor on top of the catalyst bed of the reactor is used to prevent channeling effects.

Reactor 22 is also a downflow fixed bed adiabatic reactor, containing a catalyst different from the first stage and, more specifically, a catalyst suitable for the hydrogenolysis of the dimethyl succinate to 1,4-butanediol; depending from the conditions of pressure and temperature, together with BDO, variable amounts of gamma-butyrolactone and/or tetrahydrofuran can be produced.

Product stream 9 from the reactor is first cooled and then it enters the separator vessel 23, where the crude liquid product 13, containing mostly BDO with lower percentages of gamma-butyrolactone, tetrahydrofuran, methanol, water, unreacted dimethyl succinate and impurities, separates from the vapor phase stream 10, consisting essentially in hydrogen, with lower amounts of methanol, tetrahydrofuran and water. The gaseous stream 10 is then recycled back via the compressor 20, which differential pressure corresponds to the total pressure drop, due to reactors, heat exchangers, separators, piping and control valves, of the plant.

The discharge stream 11 from the compressor, together with the fresh hydrogen stream 2, constitutes the overall reaction gas 12 used in the hydrogenation reactors.

EXAMPLE

Figure 2A:
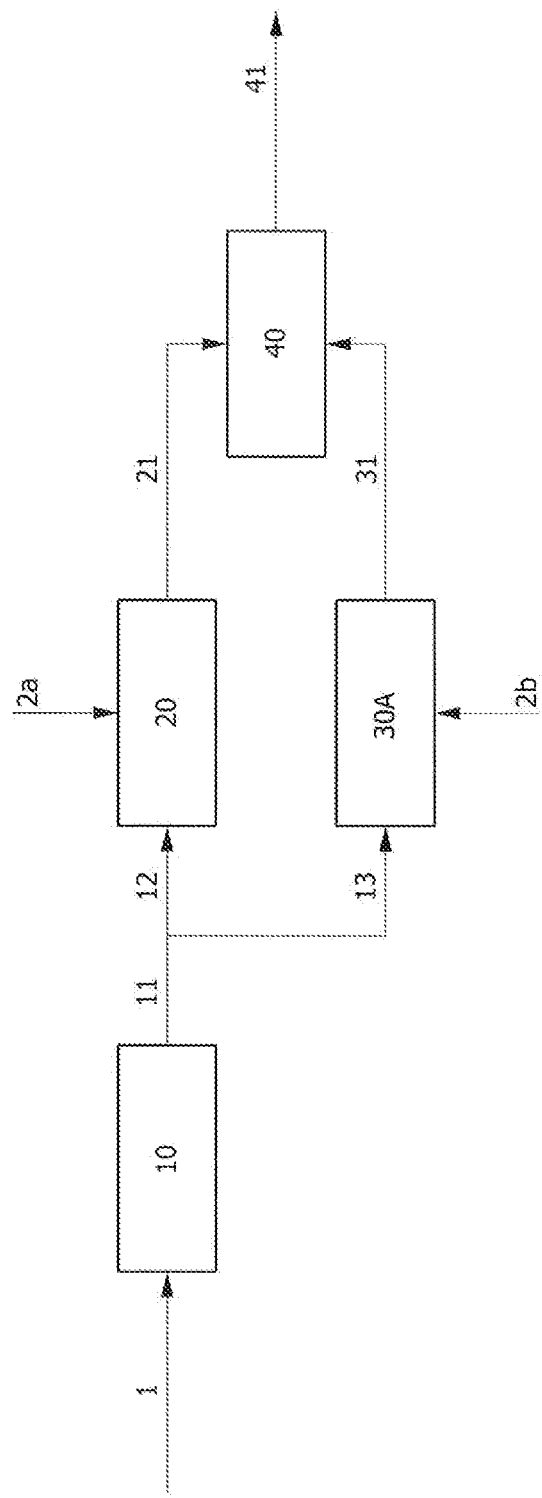
FIG. 2A s a block diagram, showing the production of PBS from n-butane, via maleic anhydride and two different hydrogenation plants, one to produce BDO and one to produce succinic acid.
Figure 2B:
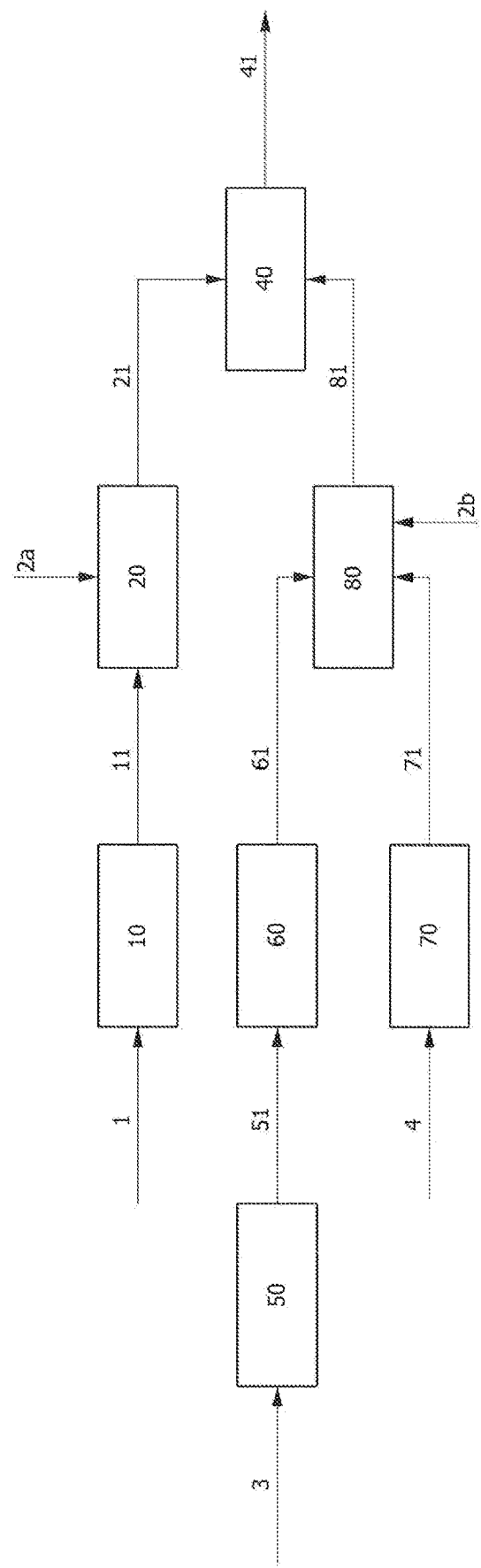
FIG. 2B is a block diagram, showing the production of PBS, using as raw materials n-butane for the production of succinic acid and natural gas and/or coal to produce butanediol by the Reppe process.
Figure 2C:
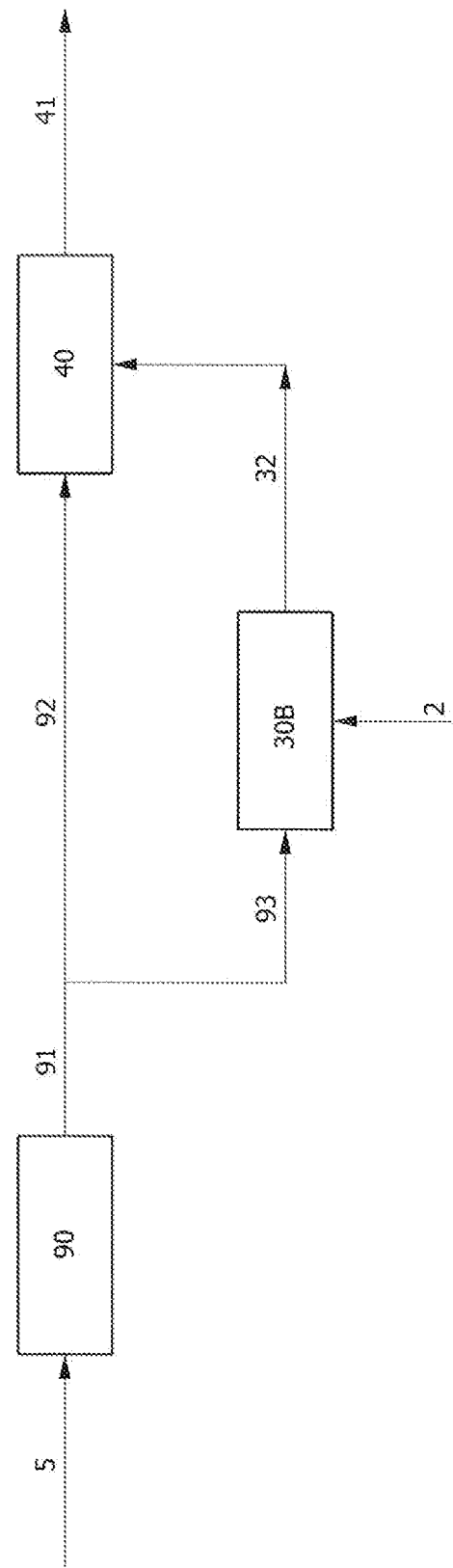
FIG. 2C is a block diagram for the production of PBS, using renewable raw materials, commonly defined as bio-based materials.
Figure 3:
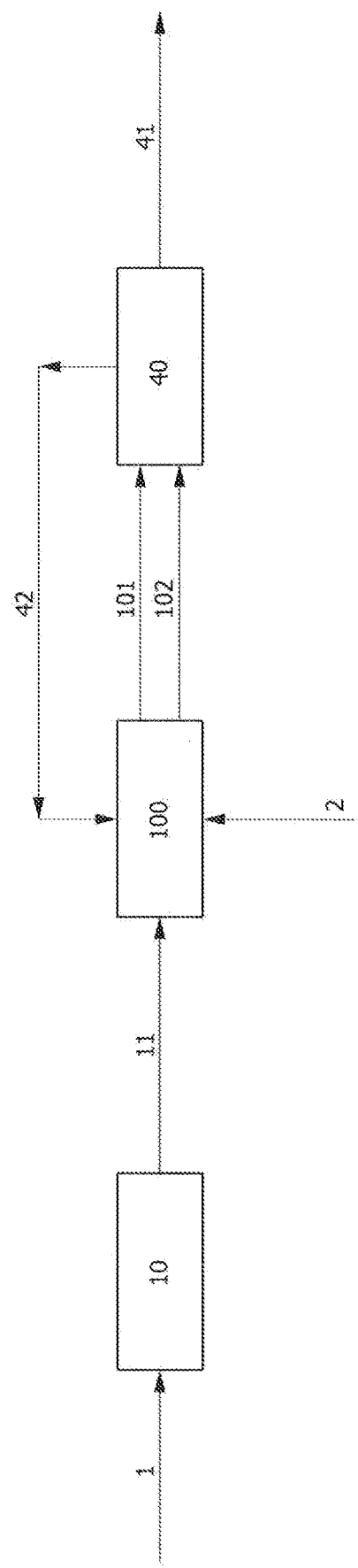
FIG. 3 is a block diagram according to the present process, with co-production of butanediol and dimethyl succinate used as raw materials for the polybutylene succinate manufacturing.

The process of this application is now described by means of examples, with reference to the FIGS. 2A, 2B and 2C. that represent the prior art, in three different configurations, while FIG. 3 is a block scheme of the plants configuration, according to the steps and the operating conditions described in this invention.

For scope of clarity, the FIGS. 2A, 2B, 2C and 3 use the same nomenclature, as follows:
the numbers identified by multiples of ten represent the units of production:
10 is a maleic anhydride production unit, by n-butane oxidation
20 is a succinic acid production unit, by hydrogenation of maleic anhydride
30A is a butanediol production unit, by esterification of MA with methanol to produce dimethyl maleate and by hydrogenolysis of DMM to BDO, according to the prior art
30B is a butanediol production unit, by esterification of succinic acid with methanol to produce dimethyl succinate and by hydrogenolysis of DMS to BDO
40 is a polybutylene succinate unit, through catalytic polycondensation of butanediol with succinic acid or with dimethyl succinate 50 is a methanol plant, stating from natural gas or other raw material
60 is a formaldehyde unit, using methanol feedstock
70 is an acetylene unit, starting from natural gas or coal
80 is butanediol unit, using the Reppe process
90 is a succinic acid unit, using a bio-process from renewable raw materials
100 is a butanediol production unit, by esterification of MA with methanol 1 maleate and by co-production of dimethyl succinate and butanediol by two steps hydrogenation, according to the process of this application The numbers from 1 to 5 are the original raw materials, fossil or renewable, used for the manufacture of PBS, as follows:
Stream 1 is the n-butane used for the production of maleic anhydride by catalytic oxidation in gas phase
Stream 2 the is hydrogen used for the hydrogenation/hydrogenolysis of maleic anhydride to succinic acid and to butanediol
Stream 3 is the natural gas used for production of methanol
Stream 4 is natural gas or coal used for production of acetylene
Stream 5 is a renewable raw material used for production of bio-succinic acid Other numbers identify intermediate products, final product or recycle streams, as follows:
Stream 11 is the maleic anhydride produced from n-butane
Stream 12 is the maleic anhydride used for the production of succinic acid
Stream 13 is the maleic anhydride used for the production of butanediol
Stream 21 is the succinic acid produced from maleic anhydride Stream 31 is the butanediol produced from maleic anhydride
Stream 32 is the butanediol produced from bio-succinic acid
Stream 41 is in both FIGS. 2 and 3 the final product, polybutylene succinate
Stream 42 represents the methanol recycled from the PBS unit to the BDO unit, according to the process described in this invention
Stream 51 is the methanol produced from natural gas Stream 61 is the formaldehyde produced from methanol
Stream 71 is the acetylene produced from coal or from natural gas
Stream 81 is the butanediol produced from formaldehyde and acetylene, by the Reppe process
Stream 91 is the total bio-succinic acid produced from a renewable resource
Stream 92 is the fraction of bio-succinic acid used as feedstock for the PBS manufacture
Stream 93 is the fraction of bio-succinic acid used as feedstock for the production of butanediol Stream 101 is the dimethyl succinate co-produced according to the process described in this invention
Stream 102 is the butanediol co-produced according to the process described in this invention.

FIG. 2A represents the block diagrams showing the sequence of a plant for the production of PBS, according to a first option of the prior art, where the starting raw materials are n-butane, stream 1 and hydrogen, streams 2a and 2b. The n-butane enters the plant 10, where it produces by catalytic oxidation with air or oxygen, raw maleic anhydride, which is then recovered by organic solvent and purified, to produce maleic anhydride in liquid state, as stream 11. The stream 11 is divided in two parts. The stream 12 enters the plant 20, where it is hydrogenated to succinic anhydride and hydrated to succinic acid, stream 21. The second fraction of maleic anhydride stream 13 enters the butanediol plant 30A, where it is transformed, through a process of esterification, hydrogenation and distillation, to high purity butanediol, stream 31. Stream 21 and 31 are the raw materials for the manufacture of polybutylene succinate stream 41 in the polycondensation plant 40.

FIG. 2B shows a second option according to the prior art, where the production of succinic acid stream 21 follows the same route described in FIG. 2A, while the BDO is produced in plant 80 according to the Reppe route. Reppe route uses formaldehyde, stream 61, and acetylene, stream 71, as raw materials. In turn, the formaldehyde is produced from methanol stream 51 in the plant 60 and the methanol from natural gas stream 3 in plant 50. Acetylene stream 71 is produced from coal or natural gas stream 3 in plant 50. Totally, seven different plants are connected in series or parallel to finally produce PBS.

FIG. 2C is a third option, more popular and eco-friendly method of manufacturing PBS: corn, sugarcane molasses or other bio-masses, stream 5, are transformed by fermentation and several steps of purification in plant 90, to produce high purity solid succinic acid, stream 91. Part of the SA is fed as stream 93 to a BDO plant 30B, where by esterification, hydrogenation and purification, it is transformed in high purity BDO stream 32. The BDO, together with the remaining part of SA stream 92, enters the polycondensation plant 40, where PBS, stream 41, is produced by esterification and polycondensation. The scheme is seemingly very simple: the PBS is produced only by three units. Unfortunately, the complexity and the low selectivity of the bio-fermentation process cause a very high production cost of the succinic acid, which today limits the commercial success of this route.

Of course, the block schemes of FIGS. 2A, 2B and 2C do not represent the complete scenario of the prior art for the production of PBS. For example in a combination of FIG. 2B and FIG. 2C, the BDO is produced by the Reppe process and the SA by bio-fermentation, with production of PBS partially from fossil material and partially from renewable resource.

In a different example, the bio-route of FIG. 2C is modified, since the BDO may be produced directly by fermentation of biomasses without the intermediate production of succinic acid. In this option the unit 90 and 30B are in parallel, rather than in series.

Whichever is the combination between bio-processes and conventional petrochemical processes, the result is a variable but always high cost of the final PBS product.

Finally, the FIG. 3 illustrates the block scheme of the plants configuration, including the co-production of butanediol and dimethyl succinate, according to the steps and the operating conditions described in this invention. Same as in FIG. 2A, the unit 10 represents a maleic anhydride production unit through catalytic oxidation of n-butane stream 1. The maleic anhydride stream 11 enter the BDO plant 100, which details are described in FIG. 1. The two co-products from unit 100, DMS stream 101 and BDO stream 102, enter together the unit 40, where is produced polybutylene succinate, stream 41. The methanol, stream 42, produced by transesterification reaction is recycled back to the BDO plant 100 and used for the esterification of the maleic anhydride to dimethyl maleate.

Incidentally, it should be noted that the production of PBS using dimethyl succinate rather than succinic acid offer two advantages.

First, while the succinic acid is a solid, the dimethyl succinate is a liquid at ambient conditions and, therefore, it can be handled and well mixed with the other reagent, butanediol, much easier and efficiently compared to a solid material.

The second advantage is related to the expected lower amount, approximately half, of tetrahydrofuran produced during the synthesis of PBS, compared to the use of succinic acid. Tetrahydrofuran is a by-product derived from the dehydration of butanediol and, therefore, the use of DMS contribute to the reduction of the specific consumption of BDO and, by cascade, of hydrogen, maleic anhydride and n-butane.

Example 1 According to the Invention

In a units configuration according to FIG. 3, 100 Kg/h of n-butane (stream 1), with 97% purity, are oxidized by air in a maleic anhydride plant 10, to produce 100 kg/h of purified maleic anhydride, stream 11, having a purity of 99.9%. The maleic anhydride enters the BDO synthesis plant 100, together with 6.5 Kg/h of hydrogen, stream 2, and 29.1 Kg/h of recycle methanol, stream 42, from the PBS unit 40. All the gamma-butyrolactone produced in the hydrogenation and the unconverted DMS are separated in the distillation section of the unit and then recycled to the second hydrogenation reactor. The products from the BDO plant to the PBS polycondensation unit 40 are 66.6 Kg/h of DMS, stream 101, and 45.4 Kg/h of BDO, stream 102. The molar fraction of DMS, in the total feed to PBS unit, is around 0.47.

The polybutylene succinate product, stream 41, is around 77.4 Kg/h.

As summary, in this example, 100 Kg/h of n-butane produce 77.4 Kg/h of polymer.

Of course, the material balance of this example is simplified, since it does not show the oxygen consumed, the unconverted n-butane and the water/carbon monoxide/carbon dioxide/organic acids produced in unit 10, the THF and the small amount of by-products of unit 100, the THE produced in unit 40 and other minor losses.

Example 2 According to the Invention

In a process configuration in accordance with the present invention and as shown in FIG. 1:
  2 Kmol/h of dimethyl maleate, at 99% purity, stream 1, and 6.4 Kmol/h of hydrogen, at 99.99% purity (stream 2), join a hydrogen rich recycle stream 11, containing 45 Kmol/h of hydrogen, and 10 Kmol/h of dimethyl succinate, stream 7, recycled from the outlet of the first reactor.

The resulting combined temperature at the inlet of the first stage of reaction 21 (stream 4) is around 120° C. The first reactor contains a single catalytic bed, consisting of ruthenium supported on alumina.

The outlet from the first stage of reaction, stream 5, is flashed in a vessel for the separation of the vapor phase, stream 16.

The resulting liquid is divided in three parts, as follows:
  Stream 7: 10 Kmol/h are cooled and recycled at the inlet of the first stage
  Stream 8: 0.9 Kmol/h are separated as crude DMS product The remaining liquid portion, stream 15, enters the second reactor 22, together with the hydrogen gas, stream 16, separated in the flash vessel.

The second reactor contains a copper chromite catalyst in a single bed. The inlet temperature is 170° C.

The pressure in both stages of reaction is 70 barg, with a slightly lower pressure in the second stage due to the pressure drop.

The effluent from reactor 22 (stream 9), after cooling at around 40 to 50° C., not shown in FIG. 1, enters the separation vessel 23, where the crude liquid BDO, stream 13, separates from the recycle gas 10.

The crude BDO is then sent to the distillation columns (not shown in the drawing), for the separation of THF, methanol, water, GBL/DMS azeotropic mixture, recycled back as stream 14 to the second reactor 22. Finally, the butanediol is separated from the light and heavy by-products.

The hydrogen rich gas stream 10 enters the compressor 20. The compressed gas 11 joins the fresh hydrogen 2 and the resulting stream 12, after heating (not shown in the drawing), represents the total hydrogen gas entering the first stage reactor 21.

The attached Table 1 and Table 2 summarize the main results of the operation, as conversion, selectivity and operating parameters.

TABLE 1

| First reactor-DMM Hydrogenation | |
|---|---|
| Fresh feed flowrate (DMM) | 288.3 Kg/h |
| Hydrogen flowrate | |
| Fresh | 6.4 Kmol/h |
| Recycle | 45 Kmol/h |
| Total | 51.4 Kmol/h |
| Temperature in/out | 120/170° C. |
| Pressure | 70 barg |
| Liquid hourly Space Velocity | 2.0 hr$^{-1}$ |
| Molar ratio H2/DMM | 25.7 |
| DMM conversion | 100% |
| Selectivity to DMS | higher than 99% |
| Crude DMS product | |
| Flowrate | 131.5 Kg/h |
| Purity | 98.5 wt % |

TABLE 2

| Second reactor-DMS Hydrogenolysis | |
|---|---|
| Fresh feed flowrate (DMS) | 162 Kg/h |
| Hydrogen flowrate | 49.4 Kmol/h |
| Temperature in/out | 170/180° C. |
| Pressure | 69.8 barg |
| Liquid hourly Space Velocity | 0.2 hr$^{-1}$ |
| Molar ratio H2/DMS | 44.9 |
| DMS conversion | 97.5% |
| Selectivity to BDO | 93% (referred to the operation with total GBL recycle) |
| Crude BDO product | |
| Flowrate | 170 kg/h |
| Purity | 53 wt % (referred to the overall product, including methanol and water) |

The invention claimed is:

1. A process for co-producing, from dialkyl maleates and hydrogen, dialkyl succinate and 1,4-butanediol, said process comprising the following steps:

a) hydrogenating a stream of dialkyl maleate in a first stage of reaction over suitable catalyst to produce dialkyl succinate;

b) further hydrogenating part of the dialkyl succinate produced in the first stage of reaction in a second stage of reaction, by using a different suitable catalyst, for producing mainly 1,4-butanediol, together with minor amounts of gamma-butyrolactone and tetrahydrofuran as co-products; the effluent is subject to cooling, phase separation and distillation to produce 1,4-butanediol, wherein, the first stage of reaction operates from 80 to 130° C. as inlet temperature, from 30 to 80 bar as pressure and with liquid hourly space velocity from 0.5 to 2.0 the second stage of reaction operates from 160 to 190° C. as inlet temperature, from 30 to 80 bar as pressure and with liquid hourly space velocity from 0.1 to 0.3 in both stages of reaction, the conditions as hydrogen/organic feed ratio, pressure and temperature are such to maintain the reactors in mixed liquid/vapor phase characterized in that:

the effluent from the first stage of reaction is separated in a flash vessel to produce a liquid stream, rich in dialkyl succinate, and splitting this stream in three portions:

i) a first part, corresponding to less than 50% mol of total production, is further subject to low pressure phase separation, to separate the absorbed hydrogen, and to distillation to produce high purity dialkyl succinate;

ii) a second part is sent to the second stage of reaction;

iii) a recirculation liquid, which by a pump is cooled in a heat exchanger and sent back to the inlet of the first stage of reaction;

the hydrogen/organic feed molar ratio is in the range from 15 to 30 in the first stage of reaction and from 30 to 60 in the second stage of reaction; and the dimethyl succinate, not converted in the second stage of reaction and separated in the distillation section in mixture with some amount of gamma-butyrolactone, is recycled to the second stage of reaction.

2. The process according to claim 1, wherein the operation is performed on a continuous basis.

3. The process according to claim 1, wherein the catalyst used in the first stage of reaction comprises between 0.1 and 2.0% by weight, relative to the total weight of the catalyst, of a low content active metal selected from the group consisting of palladium, ruthenium, platinum or mixture thereof, applied to a support material comprising carbon, aluminum oxide, silicon oxide.

4. The process according to claim 1, wherein the catalyst used for hydrogenolysis in the second stage is a copper containing catalyst, selected from a copper-chromite and a copper-zinc oxide catalyst.

5. The process according to claim 1 the dialkyl maleate is dimethyl maleate and dialkyl succinate is dimethyl succinate.

6. The process according to claim 5, wherein the dimethyl maleate has very high purity, not less than 97 wt %.

7. The process according to claim 1, wherein both reaction stages are fixed bed adiabatic reactors.

8. The process according to claim 1, wherein the inlet temperature to the second stage of reaction is controlled by the recirculation rate at the first stage of reaction.

9. The process according to claim 1 wherein the amount of the liquid recirculated from the outlet to the inlet of the first stage of reaction is from 1 to 10 times the weight amount of the compound to be hydrogenated.

10. The process according to claim 9, wherein the amount of the liquid recirculated from the outlet to the inlet of the first stage of reaction is from 2 to 4 times the weight amount of the compound to be hydrogenated.

11. The process according to claim 1, wherein the required hydrogen/organic feed molar ratio is achieved by cooling the effluent from the second stage of reaction at a temperature between 20 to 60° C., by separating the resulting liquid and gaseous phases in a dedicated vessel, by recirculating the gaseous phase through a recycle compressor.

12. The process according to claim 1, wherein both the purified dimethyl succinate produced in the first stage of reaction and the purified 1,4-butanediol produced in the second stage of reaction are used as raw materials of a polyester unit, producing polybutylene succinate alone or, by using butanediol, dimethyl succinate together with terephthalic acid or adipic acid or esters of the two dicarboxylic acids, as co-polymer.

13. The process according to claim 12 wherein methanol produced in the polybutylene succinate unit by transesterification is used together with maleic anhydride for producing the dimethyl maleate fed to the first stage of hydrogenation.

14. The process according to claim 1 wherein the flash of the first reactor effluent occurs in an enlarged top section of the second stage of reaction, equipped with a chimney tray, including an overflow device, of pipe or downcomer type.

15. The process according to claim 1 wherein the separation of the vapor phase and liquid phase is obtained using two stacked reactors, with intermediate separation of phases.

* * * * *